United States Patent
Wardlaw

[11] 3,976,464
[45] Aug. 24, 1976

[54] SKIMMER

[75] Inventor: William G. Wardlaw, Anderson, S.C.

[73] Assignee: Owens-Corning Fiberglas Corporation, Toledo, Ohio

[22] Filed: July 23, 1975

[21] Appl. No.: 598,308

Related U.S. Application Data

[63] Continuation of Ser. No. 494,664, Aug. 5, 1974, abandoned.

[52] U.S. Cl. ................................. 65/337; 65/345; 65/346
[51] Int. Cl.² .......................................... C03B 5/20
[58] Field of Search ............ 65/337, 338, 345, 346, 65/347

[56] References Cited
UNITED STATES PATENTS

2,049,600  8/1936  Wright ................................. 65/95

FOREIGN PATENTS OR APPLICATIONS

247,178  5/1963  Australia ............................... 65/345

*Primary Examiner*—Arthur D. Kellogg
*Attorney, Agent, or Firm*—John W. Overman; Allen D. Gutchess, Jr.; Ronald C. Hudgens

[57] ABSTRACT

A water-cooled skimmer is provided for a glass-melting furnace. The skimmer includes a platinum plate which is designed to fit closely within the interior of the throat of a glass-melting furnace and extend transversely thereof. The plate is rectangular and is peripherally cooled, with a coolant passage extending along the lower edge and side edge portions of the plate and having end portions extending outside the throat for connection with a coolant inlet and outlet. A supporting member is affixed to the plate and extends horizontally therefrom, being supported by the side walls of the throat, and an additional coolant passage preferably extends along the support and is in heat-exchange relationship with the upper edge of said plate. The cooling of the skimmer provides a long life therefor and also causes the molten glass tending to flow between the side edges of the skimmer plate and the side walls of the throat to solidify or freeze, thereby preventing the molten glass and impurities from flowing therearound. The skimmer takes up little room longitudinally of the throat and can be inserted as a repair skimmer in an existing throat through a narrow slot formed therein, greatly facilitating the repair.

3 Claims, 6 Drawing Figures

SKIMMER

This is a continuation of application Ser. No. 494,664, filed Aug. 5, 1974 now abandoned.

This invention relates to a peripherally-cooled skimmer for use in a melting furnace and particularly for use in the throat of a glass-melting furnace.

Skimmer blocks have heretofore been used in the outlets or throats of glass-melting furnaces, especially where the outgoing molten glass must be of utmost purity, as when used to form fibers. Particularly where the fibers are in the form of continuous textile filaments, a minute piece of solid material in the molten glass, commonly called a seed or stone, causes a break in a filament being attenuated and necessitates that the bushing operation be stopped and the filaments being attenuated to be restarted by an operator, a difficult, time-consuming, and laborious operation.

A skimmer block is positioned in the path of the exiting molten glass so as to extend above and below the surface thereof. In this manner, the skimmer block acts as a dam to hold back bubbles and solid particles carried along the surface of the molten glass, such material commonly being known as foam and scum. The bubbles are formed from volatiles in the glass batch and the scum commonly comes from particles in the batch which have not become vitreous by the time they reach the skimmer block. These slowly dissolve or redissolve in the molten glass and become part of the homogeneous molten glass, at least by the time they pass under the skimmer block with the molten glass.

Heretofore, the skimmer blocks commonly had been large blocks of refractory material covered with platinum. The blocks had been built into the side walls of the throat of the glass-melting furnace which effectively prevented the molten glass from eroding the side edges of the skimmer block and eventually passing around the block, between it and the side walls of the throat. A fuel-fired glass-melting furnace usually has a life expectancy in the order of five to seven years and at times, the skimmer blocks fail prior to the end of the expected furnace life. The failure usually occurs at the portion of the skimmer block near the surface of the glass where the block is eroded or worn away to the point that it no longer serves as a dam for the foam and scum. Consequently, these materials pass with the molten glass through the main and the cross channels to forehearths and to the bushings. They then cause breakouts in the glass filaments being attenuated and disruption of the operation, greatly reducing the overall efficiency thereof.

The skimmer block is extremely difficult to replace because the furnace cannot be shut off since the glass will then solidify in the throat, channels, and forehearth and cannot be remelted. Consequently, repairs must be made at an elevated temperature, the molten glass in the throat usually being at a temperature in the order of 2500°–2600°F. Since the old, eroded skimmer block cannot be removed, a new skimmer block has to be placed in operation downstream of the old one. This necessitates the forming of a large opening in the top wall of the throat of the furnace, this being an almost impossible maneuver with the extreme temperatures and the hot gases jetting out from the resulting opening which must extend completely across the throat and be wider than the skimmer block is thick. On the other hand, it is extremely important to obtain the maximum possible life from the glass-melting furnace since the rebuilding of a furnace and repair and improvements to related equipment constitutes a multi-million dollar expense. Thus, there is a three-fold dilemma of intolerable fiber operation disruption, substantially impossible skimmer blocks replacement, and extremely costly furnace rebuilding.

The present invention provides a new skimmer which is long lived and can be relatively easily installed as a replacement skimmer if necessary. The new skimmer constitutes a rectangular sheet of a platinum alloy of a size to extend across the throat or other passage of the glass-melting furnace in which it is to be used and of a height sufficient to extend below the surface of the molten glass and above the surface to or near the top wall of the throat. This plate is supported by the upper wall portions of the throat, as by a channel member affixed to an upper portion of the sheet and extending beyond the side edges thereof into or through the side walls of the throat. The sheet is peripherally cooled to enable it to withstand the high temperatures encountered for a long period of time and to provide adequate stiffness and dimensional stability for the sheet in the furnace. The cooling of the side edges of the sheet, near the inner surfaces of the side walls of the throat, causes the glass tending to pass therebetween to solidify or freeze and thereby form a natural barrier against such flow. This is particularly important where the skimmer is not built into the side walls of the throat, as when used as a replacement skimmer, since relatively rapid erosion of the side edges of the skimmer block otherwise would result.

The upper edge and the supporting member of the new skimmer can also be cooled by a separate line to provide additional cooling for the sheet and to provide cooling for the supporting member to better enable it to retain its strength and dimensional stability. The cooling can be achieved through lines or tubes affixed to one side, preferably the upstream side, of the sheet with end portions extending outside the throat to receive coolant inlet and outlet connections.

Because the new skimmer, even with the peripheral cooling means, is but a small fraction of the thickness of the skimmer blocks heretofore employed, it can be relatively easily used in a repair situation downstream of the eroded skimmer by cutting a narrow slot in the top of the throat. The thinness of the new skimmer also enables it to be used downstream of the eroded skimmer in a space which often is of limited length.

It is, therefore, a principal object of the invention to provide an improved skimmer for a glass-melting furnace or the like.

Another object of the invention is to provide a peripherally-cooled skimmer which has a long life.

Still another object of the invention is to provide a peripherally-cooled skimmer which solidifies molten material tending to flow around the side edges thereof.

A further object of the invention is to provide a skimmer made of a thin sheet of a refractory alloy.

Still a further object of the invention is to provide a relatively thin skimmer which can be more effectively used for replacement or repair.

Other objects and advantages of the invention will be apparent from the following detailed description of a preferred embodiment thereof, reference being made to the accompanying drawings, in which.

Figure 1:
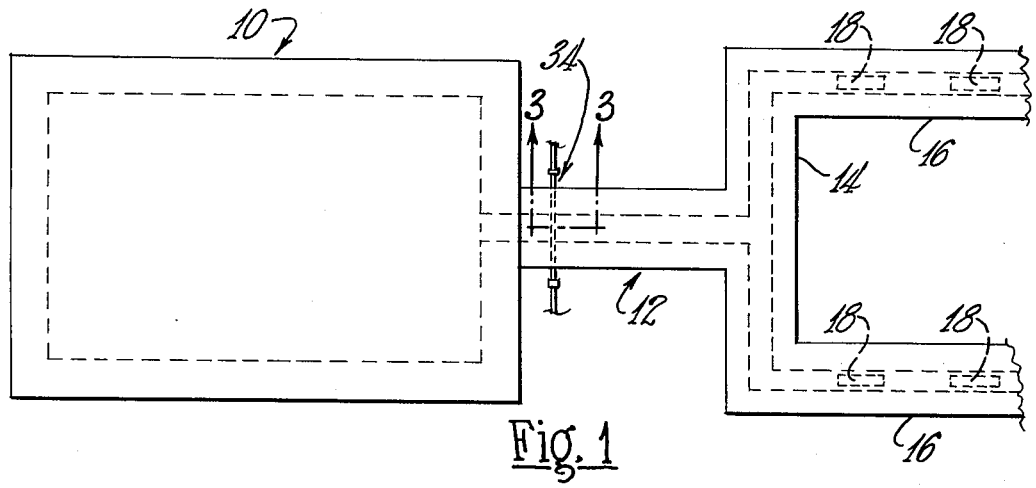
FIG. 1 is a schematic, fragmentary plan view of a glass-melting furnace, filament-forming bushings, and a skimmer according to the invention.
Figure 2:
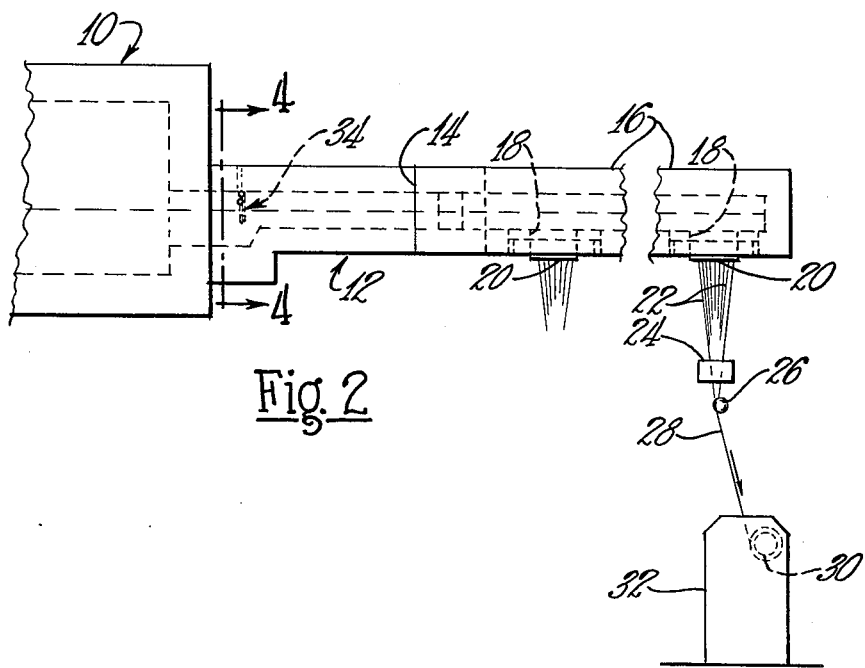
FIG. 2 is a schematic, fragmentary side view in elevation of the glass-melting furnace and filament-forming bushings of FIG. 1.

Referring to the drawings and particularly FIGS. 1 and 2, a glass-melting tank indicated at 10 can be of the usual construction, either fuel fired or electrically heated. Glass batch is supplied to the left end of the furnace by suitable means with the glass moving through the tank and being converted to a vitreous state by the heat so as to be substantially fully molten by the time it reaches an outlet throat 12. In this instance, the molten glass flows through a main channel 14 to forehearths 16. A plurality of outlets 18 are located in the bottom of each of the forehearths 16 with the molten glass supplied through the outlets to filament-forming bushings 20 located therebelow. The molten glass is attenuated through orifices in the bottom of each of the bushings into filaments 22. These can be coated by an applicator 24 in a well known manner, and collected around a gathering shoe 26 into a strand 28 which is would onto a collet 30 driven by a suitable motor in a housing 32. The rotation of the collet provides the pulling or attenuating force which draws the molten glass into the filaments 22 through the bushings 20. The filaments 22 are very small in diameter, typically being from 0.00010 inch to 0.00040 inch in diameter. Obviously, the smallest impurity in the molten glass will bridge or substantially bridge the thickness of the filament and cause it to part, known as a break-out. When this occurs, an operator must stop the operation of the bushing, including all of the other filaments, collect the broken filament above the break-out, and restart the filaments from the bushing. This is time-consuming and laborious and can seriously affect the production of the bushings. Further, a fiber-forming operation might include ten of the forehearths 16, each having ten bushings for a total of one hundred. Even an occasional break-out of filaments can produce an almost intolerable situation from a production and labor standpoint.

While the glass flowing through the tank 10 from the charge end to the throat 12 is substantially fully molten by the time it reaches the throat, some foam and scum still exists by the time the glass reaches the throat. The foam can be in the form of bubbles resulting from volatile materials within the glass batch. The scum can be in the form of seeds or stones of minute, not yet molten, glass batch particles. The bubbles will either redissolve in the glass if held at the throat for a period of time or will redissolve in the glass as it passes under the skimmer in the throat. Similarly, if the seeds or stones are held in the molten glass for a period of time, they will become fully molten at least by the time the glass with the particles passes under the skimmer.

The skimmer block heretofore used, as previously discussed, consists of a large, thick refractory block covered with platinum. The block was built into the walls of the throat of the glass-melting tank when built. The skimmer block required a considerable amount of the costly platinum material and yet would tend to erode at the surface of the glass after a period of operation. If the failure occured before the expected life of the glass-melting tank had been reached, the fiber-forming operation would seriously deteriorate as the foam and scum were carried with the molten glass to the bushings. The replacement of the skimmer block was an almost impossible task, as previously discussed. On the other hand, replacement was almost imperative in order to obtain the full expected life of the expensive glass-melting furnace.

Figure 3:
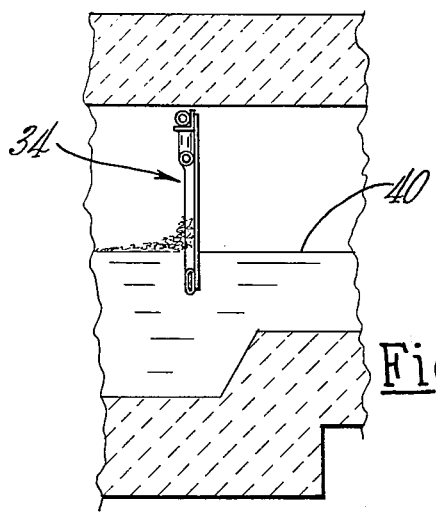
FIG. 3 is an enlarged, fragmentary view in cross section taken along the line 3—3 of FIG. 1.
Figure 5:
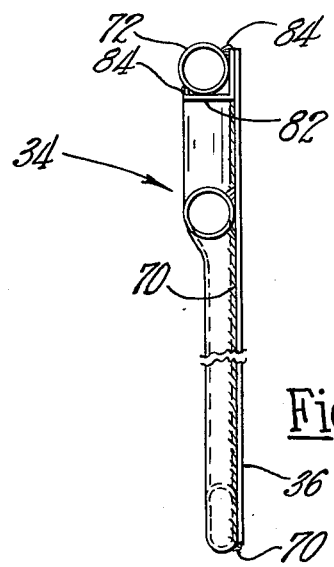
FIG. 5 is a further enlarged, end view of the new skimmer.
Figure 4:
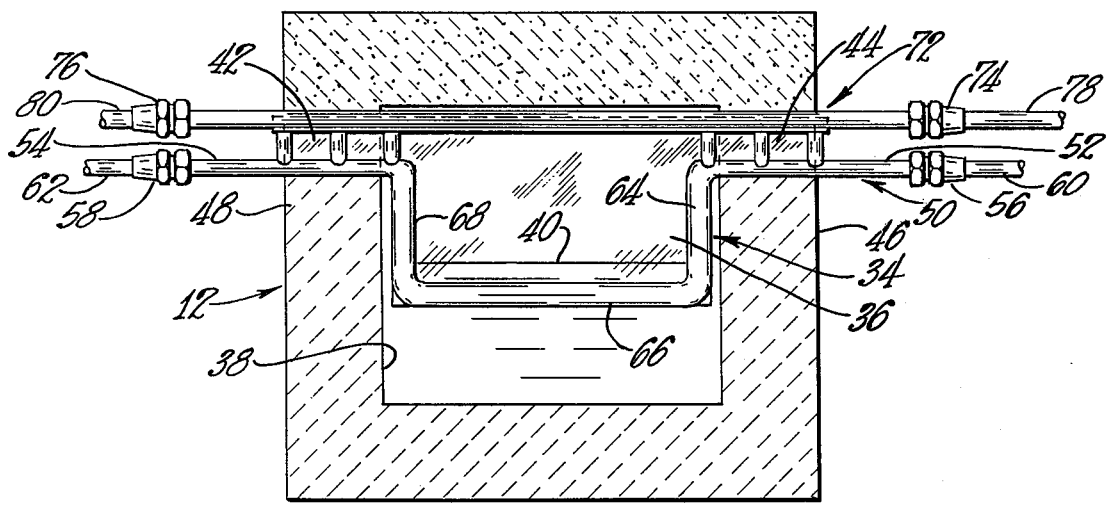
FIG. 4 is an enlarged, somewhat schematic view in cross section taken along the line 4—4 of FIG. 2.

The new skimmer, in accordance with the invention, is indicated at 34, and is positioned transversely across the throat 12 of the glass-melting tank near the entrance of the throat in generally the same position as skimmer blocks heretofore employed. The new skimmer block 34 includes a generally rectangular sheet or plate 36 of platinum (FIGS. 4 and 5), being of a size to substantially extend completely across a passage 38 of the throat 12 and being of a height to extend from a point near the top of the throat passage 38 to a point below the level of the glass in the throat passage 38, this level being indicated by a line 40 in FIGS. 3 and 4. The plate 36 also has side extensions 42 and 44 which extend at least partially through refractory side walls 46 and 48 of the throat 12 to aid in holding the skimmer in position.

The rectangular portion of the plate 36 is peripherally-cooled by a lower coolant tube 50. The tube 50 has a horizontal inlet portion 52 and a horizontal outlet portion 54 extending beyond the side walls 46 and 48 of the throat 12 to connections 56 and 58 where they connect with a supply tube 60 and a drain tube 62. The lower coolant tube 50 has a vertical portion 64 extending along a side edge of the plate 36, a horizontal portion 66 extending along the lower horizontal edge of the plate 36, and another vertical portion 68 extending along the other side edge of the plate 36. Hence, the three coolant tube portions 64, 66, and 68 provide peripheral cooling for the side edges and bottom edge of the plate 36. The cooling achieves stiffness and dimensional stability for the plate 36 as well as long life therefor. The vertical tube portions 64 and 68 also freeze or solidify the molten glass tending to pass between the side edges of the plate 36 and the side walls 46 and 48 of the throat 12. As shown particularly in FIG. 5, the tube portions 64-68 are flattened to enhance the heat transfer between the plate and the tubes, and the tubes are also preferably affixed to the plate 36 by continuous welds 70 for maximum heat transfer.

The horizontal portions 52 and 54 of the lower coolant tube 50, along with the side extensions 42 and 44 of the plate 36, provide support for the skimmer 34 in the throat passage 38. An upper coolant tube 72 extends completely across the throat 12 and has connectors 74 and 76 providing connections for a coolant supply tube 78 and a drain tube 80. The upper coolant tube 72 is affixed to a channel angle 82, which is also of platinum, by welds 84, and the channel angle 82 is also suitably affixed, as by welds (not shown), to the upper edge of the plate 36.

From the above, it will be seen that the new skimmer consumes less platinum than the large platinum-covered blocks heretofore employed. The new skimmer also consumes less space longitudinally of the throat, which can be particularly important when used in a replacement situation. The new skimmer also can be mounted in an existing throat by a narrow slot cut in the top thereof. Of particular importance, the peripheral cooling of the skimmer 34 achieves a long life for the skimmer.

Figure 6:
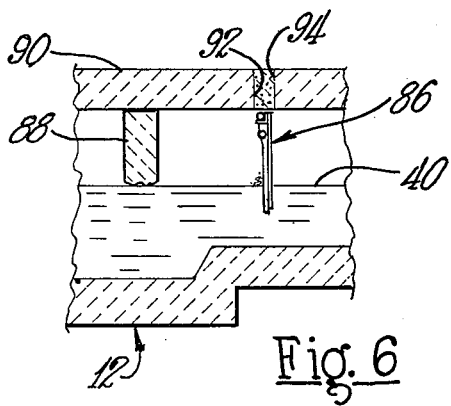
FIG. 6 is a somewhat schematic view in section similar to FIG. 3, but showing the new skimmer used as a replacement skimmer.

The use of the skimmer 34 as a replacement skimmer is indicated at 86 in FIG. 6, near a skimmer block of the old type of construction indicated at 88. The lower portion of the block 88 has eroded away at the level 40 of the glass therein. The erosion can either eat away the entire lower end of the skimmer block 88 or can form a hole therethrough near the level 40 of the glass. In either event, the scum and foam heretofore blocked by the skimmer block 88 passes thereby and goes to the bushings 20 where the break-outs occur with a substantial increase in frequency, greatly reducing the efficiency of the filament-forming production.

To replace the skimmer block 88 heretofore required the forming of a large hole in an upper wall 90 of the throat 12, the hole exceeding the thickness and length of the skimmer block. With the temperatures in the order of 2500°–2600°F., forming the hole in the throat top wall 90 was an almost impossible task, requiring labor of the utmost stamina and skill to withstand the temperatures encountered. However, the replacement skimmer 86 can be installed in the throat 12 by forming a relatively narrow opening or slot 92 in the top wall, this opening having a thickness only slightly exceeding the thickness of the replacement skimmer. The outer ends of the lower and upper cooling tubes 50 and 72 can then extend out from the top wall or the side walls can be notched in a manner similar to that of FIG. 4 to place the upper coolant tube 72 just below the lower surface of the top wall 90, as shown in FIG. 6. In either event, suitable refractory mud 94 is used to seal the opening 92 and side notches, if made, to complete the replacement operation relatively easily, as compared to that needed for the refractory block 88. Further, with the replacement skimmer 86, the peripheral cooling tubes will freeze off glass between the side edges of the skimmer and the side walls of the throat. With a replacement skimmer block of the type 88, the skimmer block cannot be built into the side walls, but must be slightly gapped therefrom in the same manner as the skimmer 86. However, with the replacement skimmer block 88, the glass will not be solidified between the edges of the block and the throat, with the result that some glass will flow therebetween. This not only enables a certain amount of scum and foam to pass by the block but also causes erosion of the side edges of the block in a matter of a few months, rendering the replacement skimmer block substantially useless in a short period of time.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A glass-melting furnace comprising a main melting tank, a throat communicating with said main melting tank for receiving molten glass therefrom, said throat having side walls spaced apart a given distance and a top wall, channel means communicating with said throat for supplying molten glass therefrom toward a plurality of product-forming means, a skimmer in said throat, said skimmer comprising a refractory member having a generally rectangular shape and having a width slightly less than the width of said throat, means affixed to said refractory member and extending generally horizontally beyond side edge portions of said refractory member and supported in a fixed position by the side walls of the throat above the surface of the molten glass therein for supporting said member in the throat with a lower edge portion of said member extending substantially below the surface of the molten glass in said throat, and means for cooling at least a portion of the periphery of said member including said lower edge portion and side edge portions thereof, said cooling means comprising means forming a passage extending along the lower edge of said refractory member and along at least parts of the side edge portions of said member and having end portions extending outside said throat above the surface of the molten glass therein for communication with coolant inlet and outlet means, said cooling means along the side edge portions of said member being parallel to the side walls of said throat and being positioned sufficiently close to the side walls of said throat to solidify the molten glass tending to pass between the side walls and the side edge portions of said refractory member, and refractory material in said side walls sealing off those portions of said supporting means and said cooling means which extend through said side walls.

2. A replacement skimmer for use in a throat of a melting furnace when an existing skimmer has deteriorated to the point of being ineffective, said skimmer to be inserted through a slot in a top wall of the throat and permanently mounted in a fixed position in side walls thereof to extend a substantial distance below the surface of the molten material in the throat to block the flow of undesirable, non-molten material near the surface of the molten material, said replacement skimmer comprising a substantially rectangular sheet of highly refractory material, means forming a first coolant passage adjacent side and lower edges of said sheet and affixed thereto in heat-exchange relationship, the portions of said passage means adjacent the side edges of said sheet being positioned near but spaced from the side walls of the throat when said skimmer is in the fixed position to solidify the molten material tending to pass between the side walls and the side edge portions of said refractory sheet, said passage means having a first end portion extending transversely beyond a side edge of said sheet for connecting with a coolant inlet above the surface of the molten material and outside said furnace on one side of said throat, said passage means having a second end portion extending transversely beyond the other side edge of said sheet for connecting with a coolant outlet above the surface of the molten material and outside said furnace on the other side of said throat, supporting means adjacent an upper edge portion of said sheet for supporting said replacement skimmer in said throat, said supporting means comprising a structural member affixed to the upper edge portion of said sheet and extending beyond the side edges of said sheet so as to be supported in both side walls of said throat, means forming a second coolant passage adjacent the upper edge portion of said sheet for cooling the adjacent upper edge portion of said sheet, said second passage means being in heat-exchange relationship with said structural member, said second passage means having end portions extending transversely beyond the side edges of said sheet and having a first end portion for connecting with a coolant inlet outside said furnace on one side of said throat, and a second end portion for connecting with a coolant outlet outside said furnace on the other side of said throat, and connecting means between said structural member and said first coolant passage means.

3. A furnace according to claim 1 characterized by additional cooling means extending along said supporting means and partly disposed in heat-exchange relationship with an upper portion of said refractory member, and with a portion of said supporting means.